(12) United States Patent
Pierson (10) Patent No.: US 7,814,737 B2
(45) Date of Patent: *Oct. 19, 2010

(54) METHODS AND APPARATUS FOR GUIDING HARVEST RESIDUE

(76) Inventor: Douglas C. Pierson, 7 Valhalla Dr., Slayton, MN (US) 56172

( * ) Notice: Subject to any disclaimer, the term of this patent is extended or adjusted under 35 U.S.C. 154(b) by 0 days.

This patent is subject to a terminal disclaimer.

(21) Appl. No.: 12/649,503

(22) Filed: Dec. 30, 2009

(65) Prior Publication Data

US 2010/0101200 A1   Apr. 29, 2010

Related U.S. Application Data

(62) Division of application No. 11/747,529, filed on May 11, 2007, now Pat. No. 7,658,058.

(51) Int. Cl.
*A01D 45/02* (2006.01)
(52) U.S. Cl. ....................................................... 56/119
(58) Field of Classification Search ................. 56/14.3, 56/17.3, 17.4, 27.5, 119, 233–237, 327.1, 56/327.2
See application file for complete search history.

(56) References Cited

U.S. PATENT DOCUMENTS

| | | | |
|---|---|---|---|
| 1,878,941 A | 9/1932 | Lindgren |
| 1,894,412 A | 1/1933 | Neighbour |
| 2,527,190 A | 10/1950 | Kuhlman |
| 2,661,586 A | 12/1953 | Krause et al. |
| 2,989,834 A | 6/1961 | Pool et al. |
| 3,436,901 A | 4/1969 | Gehman et al. |
| 3,462,928 A | 8/1969 | Schreiner et al. |
| 3,628,316 A | 12/1971 | Rae, Sr. |
| 3,719,034 A | 3/1973 | Lange |
| 3,747,311 A | 7/1973 | DeCoene et al. |
| 3,808,783 A | 5/1974 | Sutherland et al. |
| 4,182,098 A | 1/1980 | Kass |
| 4,251,980 A | 2/1981 | Miller |
| 4,429,516 A | 2/1984 | Erickson |
| 4,704,850 A | 11/1987 | Obermeier |
| 5,724,797 A | 3/1998 | Wagstaff et al. |
| 5,806,292 A | 9/1998 | Luecke |
| 5,826,415 A | 10/1998 | Becker |
| 5,910,092 A | 6/1999 | Bennett |
| 6,374,587 B1 | 4/2002 | Wubbels et al. |
| 6,871,709 B2 | 3/2005 | Knobloch et al. |
| 7,156,186 B2 | 1/2007 | Knobloch et al. |
| 2003/0226670 A1 | 12/2003 | Knobloch et al. |
| 2005/0120695 A1 | 6/2005 | Calmer |

(Continued)

OTHER PUBLICATIONS

"The Strip-Till Tipsheet", Land & Water, Conserving Natural Resources in Illinois, University of Illinois Extension, Jan. 2003, http://www.wq.uiuc.edu/Pubs/Strip-till-Tipsheet-1-15-03.pdf.
"Pinpoint Accuracy", The Digest, Feb. 1 2005, by Larry Stalcup, http://www.novariant.com/news/pdfs/autoFarm_feature_stories/20105%20CornAndSoybeanDigest.pdf.

(Continued)

*Primary Examiner*—Thomas B Will
*Assistant Examiner*—Joan D Misa
(74) *Attorney, Agent, or Firm*—Fredrickson & Byron, P.A.

(57) ABSTRACT

Methods and systems for harvesting crop rows employ a plurality of pairs of residue guides to guide harvest residue into rows that are left behind the harvesting machine in the place of the harvested crop rows.

10 Claims, 8 Drawing Sheets

U.S. PATENT DOCUMENTS

| | | |
|---|---|---|
| 2007/0026915 A1 | 2/2007 | Anderson et al. |
| 2007/0037620 A1 | 2/2007 | Anderson et al. |
| 2007/0042822 A1 | 2/2007 | Bischoff et al. |
| 2007/0049366 A1 | 3/2007 | Pope |

OTHER PUBLICATIONS

"Strip-till-teamwork", Apply magazine, Sep. 1 2002, Ron Ross, http://apply-mag.com/mag/farming_striptill_teamwork/.

"Northwest Strip Tiller" (product brochure for Northwest Tillers, Inc. of Yakima, WA), http://www.nwtiller.com/pdf/a_7_striptiller.pdf.

METHODS AND APPARATUS FOR GUIDING HARVEST RESIDUE

RELATED APPLICATION

This application is a divisional application of U.S. application Ser. No. 11/747,529, now U.S. Pat. No. 7,658,058, which was filed on May 11, 2007, the disclosure of which is hereby incorporated by reference.

FIELD OF THE INVENTION

The present invention relates generally to agricultural harvesting equipment, and more particularly to apparatus, systems and methods for guiding harvest residue, which may improve the efficiency and/or effectiveness of farming operations related to harvesting and subsequent planting.

BACKGROUND OF THE INVENTION

In "conventional" farming operations, harvesting of crops typically results in crop harvest residue (e.g., corn stalks, leaves, tassles, etc.) being distributed somewhat randomly about the surface of a field. After the harvest, a farmer might use equipment such as a stalk chopper to shred the remaining standing stalks and residue. This would then typically be followed by a type of total coverage, deep-tillage pass with plowing equipment such as a moldboard plow, chisel plow, or a v-ripper plow, in order to tear up the soil profile and to incorporate the harvest residue into the soil. In the springtime, prior to planting the next crop, the farmer would again typically need to make one or two passes across the field with tillage tools, such as a field cultivator or disk, to prepare the soil surface to make a seed bed for planting. This harvest, post-harvest, and springtime pattern is essentially the state of the art for most conventional tillage cropping farms in operation today.

"No-till" farming is a term used to describe farming operations which are generally performed without any fall or spring tillage prior to planting. No-till planting equipment is generally equipped with a row cleaner to move the previous year's harvest residue out of the path of the row unit that places the seeds in the soil. No-till planters typically use a wavy coulter that operates at the approximate depth at which the seeds are planted. The waves on the coulter may provide some minimal tillage to allow the planter to operate in loosened soil. In many soil conditions, the coulter does not adequately loosen the dense soil that has not been previously tilled. Sidewall compaction may also result from pressing the soil sideways to form a slot to drop the seeds into. This may make it difficult to achieve good seed-to-soil contact. Poor seed germination and emergence, along with poor root development, are commonly-cited drawbacks of no-till operations, often caused by compacted soil with limited or poorly distributed pore spacing (to hold air and water). Improper pore size and distribution hinders air and water exchange, which may reduce water infiltration and utilization, and may thereby hamper healthy plant development.

"Strip-till" farming is a term that describes an emerging farming practice that has evolved from no-till farming, and can generally be described as tilling relatively narrow strips of soil between rows of the previous year's crop, and subsequently planting rows directly into the tilled strips with a planter row unit. Residue from the harvest (e.g., stalks, leaves, tassles, corn husks, etc.) is left as ground cover (as in no-till), and is distributed somewhat randomly following the harvest. In some operations, strip-tilling may be performed in the fall shortly following the harvest, with planting into the tilled strips occurring the following spring. This process is sometimes also referred to as "no-till with fall strip-tilling." Strip-tilling can also be performed in the spring, prior to or in conjunction with planting, for example, by positioning strip-till equipment ahead of the planter units. In some operations, strip-tilling may be enhanced by the application of fertilizer, preferably (but not necessarily) at the same time as strip-tilling. Anhydrous ammonia, liquid and/or dry fertilizer can be placed into the tilled strips at the same time that the strip-tillage is being performed, for example.

Strip-tilling has been performed using conventional anhydrous ammonia applicators, which may use a coulter, a knife mounted to a shank, or a double disc sealer, for example, and may also use markers or Global Positioning Satellite machine guidance to till and/or layout the strips to be planted in the spring. The shanks, or knives, are typically placed on a toolbar with the same row width as on the planter. For example, if a farmer has an 8-row, 30 inch planter (e.g., for planting 8 rows spaced apart at 30 inch intervals), he might use an 8-row strip-tillage unit to till the strips 30 inches from center-to-center, for example.

One of the difficulties encountered during strip-tilling is that harvest residue can become tangled in strip-till equipment, which can increase the amount of time and resources expended in strip-tilling operations. Another difficulty is that strip-tilling, particularly in the presence of higher crop residues, may result in slower spring warm-up of the soil in the strip till zone (which could delay planting), and may also reduce the effective seed-to-soil contact (which is desired to obtain good germination and crop emergence).

SUMMARY

In some embodiments of the invention, means for guiding harvest residue is integrated into a row crop header (such as a corn header, for example), which is, in turn, adapted to be mounted to a harvesting machine (e.g., a combine). The means preferably includes a plurality of pairs of residue guides coupled to the row crop header, such that each residue guide extends downwardly from an underside of the row crop header to guide harvest residue over a row being harvested.

In some embodiments of the invention, a system for harvesting row crops includes the harvesting machine and a row crop header that has a plurality of pairs of residue guides operatively coupled thereto for guiding residue from each crop row, that has been harvested by the harvesting machine, into a row that is left behind the harvesting machine in place of the harvested crop row.

In some embodiments of the invention, a method of managing soil for farming operations includes harvesting row crops in a way that directs harvest residue into strips, leaving exposed strips of soil therebetween. The exposed strips of soil may be subsequently planted in a given season, thereby effectively "rotating" the crop row locations from year to year.

BRIEF DESCRIPTION OF THE DRAWINGS

The present invention will hereinafter be described in conjunction with the following drawing figures, wherein like numerals denote like elements.

DETAILED DESCRIPTION

The following discussion is presented to enable a person of ordinary skill in the art to make and use the invention. Various modifications to the illustrated embodiments will be readily apparent to those skilled in the art, and the generic principles herein may be applied to other embodiments and applications without departing from the spirit and scope of the invention as defined by the appended claims. Thus, the present invention is not intended to be limited to the embodiments shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives which fall within the scope of the invention as claimed.

Although the examples in this description describe harvesting operations involving corn, the various embodiments of the invention are not so limited, and could apply to other crops such as sunflowers, for example. It should be noted that "corn" as used herein could apply to any of the many variants of corn or maize, such as yellow corn, white corn, sweet corn, indian corn, etc. As used herein, a harvesting machine may be a combine, or any other type of harvesting equipment. Similarly, a row crop header, as used herein, may include a corn header, for example, but may include other types of row crop headers. Geringhoff of Germany, for example, manufactures row crop headers used in North America. As one example, a Geringhoff corn header referred to as "Rota Disc" (see, for example, www.geringhoff.com) is adapted to slice harvest residue into approximately 6 inch segments, then spreads the residue in an even layer across the soil profile.

The number of no-till and strip-till farming operations has increased in recent years. The benefits of such farming techniques include soil preservation, for example, by reducing soil erosion. Difficulties are sometimes experienced during strip-tilling operations due to clogging or plugging of strip-tilling equipment with harvest residue. Some commercially available strip-tilling machinery attempts to address this type of difficulty by employing fluted or straight disc coulters and/or trash whipping rotating finger wheels to reduce the harvest residue into a more manageable form and/or move the harvest residue at the time of strip-tilling.

A novel approach to the problem of plugging and clogging strip-till equipment is employed by various embodiments of the invention, and involves managing the placement of harvest residue at the time of harvest. For example, at the time of harvesting a crop, certain embodiments of the invention cause the harvest residue of a row crop (such as the corn stalk residue of corn grown in rows) to remain on the field in relatively narrow strips over the rows of the crop being harvested. By managing the placement of harvest residue in this manner prior to strip-tilling, the harvest residue is much less likely to interfere with or cause plugging or clogging of strip-tillage equipment, which operates to till the soil in the area between the rows previously harvested.

Figure 1:
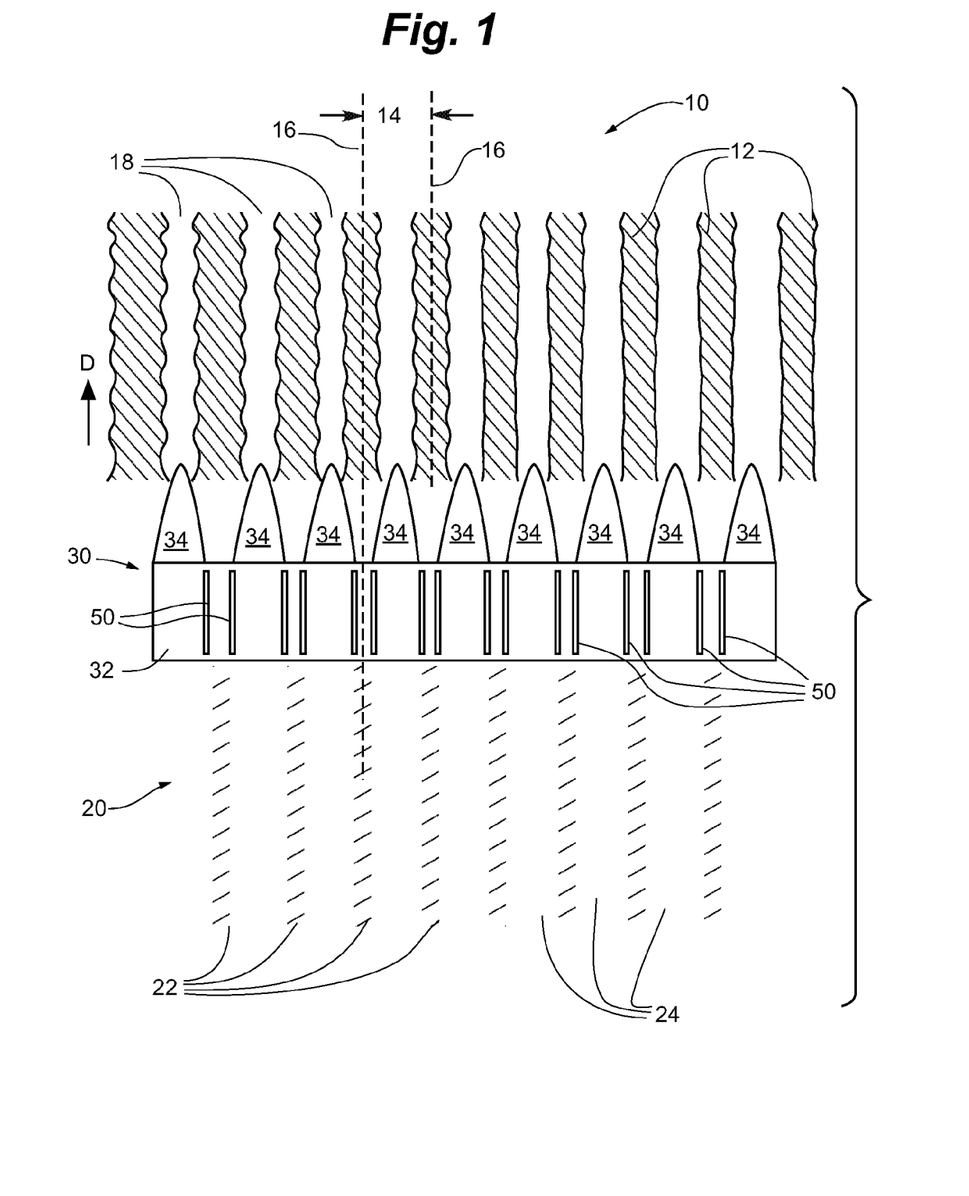
FIG. 1 is a plan view of a row crop header for use with a harvesting machine according to an embodiment of the invention.

FIG. 1 shows a plan view of a row crop 10, having a plurality of rows 12 spaced apart from one another by row spacing 14. Also shown in FIG. 1 are the areas between the rows 12 of crop 10, such areas being designated area 18. Row crop 10 may comprise rows of any crop such as corn, sunflowers, etc. Row spacing 14 may be measured from the center 16 of a given row to the center 16 of an adjacent row, for example. Row spacing 14 may be any suitable distance for the crop. For example, row spacings used in some embodiments of the invention might include 20, 22, 30, 36, 38, and 40 inch row spacings in order to be compatible with certain existing commercially available tilling and/or harvesting equipment, although the exact spacing and/or units of measurement can be varied from these examples without departing from the scope of the invention as claimed.

During harvest operations, a harvesting machine, such as a combine, is navigated through a crop to extract the desired product (e.g., ears of corn), while leaving behind a harvest residue 20 comprising stalks, leaves, and other plant waste. Typically, an attachment at the front of the harvesting machine is used to guide the crop rows into the harvesting machine. For example, FIG. 1 shows row crop header 30, adapted to be coupled to the front end of a harvesting machine (not shown in FIG. 1). Row crop header 30 may have a plurality of row divider snoots 34 to facilitate guiding the rows of plants into the harvesting machine. As shown, the row divider snoots 34 may be somewhat conical in shape. The row divider snoots 34 may be shaped such that, as they travel substantially in the areas 18 between planted rows, they cause the crops to be guided toward the centers 16 of the respective rows 12 to facilitate harvesting by the harvesting machine. Row crop header 30 also comprises a frame 32 to which the row divider snoots 34 may be mounted. In the particular example illustrated in FIG. 1, a row crop header 30 has nine row divider snoots 34 coupled to a forward portion of a frame 32, the row crop header 30 thereby being adapted to receive and guide 8 rows of the crop to be harvested into the harvesting machine. Of course, the number of rows of crop that can be handled by a row crop header is a matter of design choice and thus, can vary greatly; available corn headers, for example, usually come in 4, 6, 8, 12, 16 and 24 row models, but there may be other row number configurations offered in the machinery market.

As also shown in FIG. 1, harvest residue 20 may be distributed behind the harvesting machine as it travels in direction D through the rows of the crop. In accordance with various embodiments of the invention, the harvest residue 20 may be distributed such that the harvest residue is contained to a certain extent in relatively narrow strips 22 over the crop rows being harvested. Guiding of the harvest residue 20 in this manner may be facilitated by a residue guide 50 operatively coupled to the frame of the row crop header 30. For example, residue guide 50 may be disposed on frame 32 of the row crop header 30 in a manner that directs the harvest residue over the crop row, while limiting the ability of the harvest residue 20 to travel away from the center of the row as it exits the row crop header 30. A desired result of this arrangement is that areas or strips of substantially exposed soil 24 will be created between the relatively narrow strips 22 of harvest residue 20. The creation of exposed soil strips 24 may facilitate subsequent strip-tilling operations, since this arrangement reduces the likelihood of clogging or plugging of the strip-tilling equipment, and may improve spring soil warm-up and seed-to-soil contact in the subsequently planted crop, and may thereby increase the efficiency and/or effectiveness of strip-tilling operations.

Figure 2:
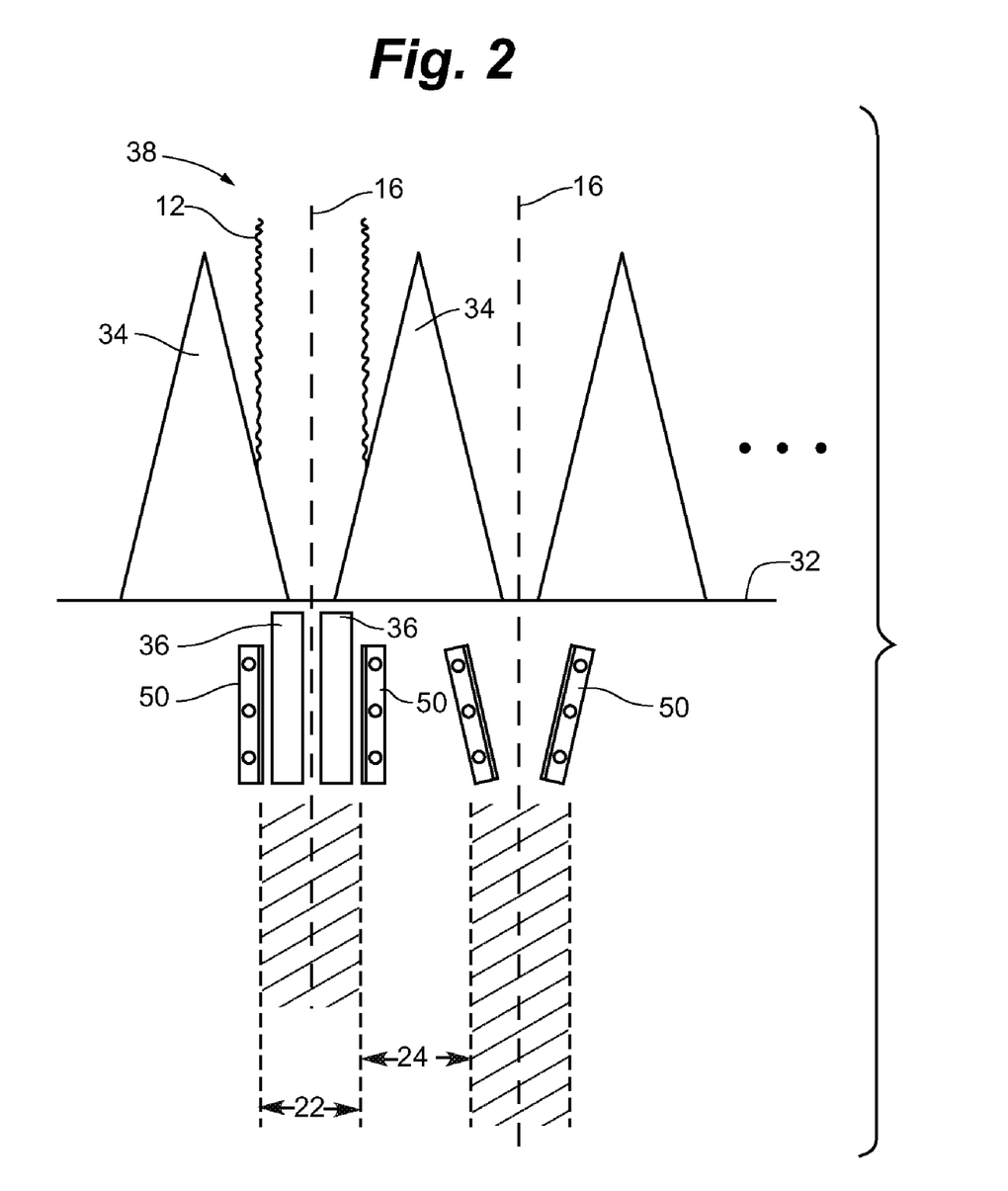
FIG. 2 is an enlarged top plan view of a row unit of a row crop header, according to certain embodiments of the invention.

FIG. 2 shows an enlarged top plan view of a row unit 38 of a row crop header, according to certain embodiments of the invention. As shown, a frame 32 of a row crop header may have a plurality of row divider snoots 34 extending forwardly of a forward portion of frame 32. The row unit 38 may be associated with a particular crop row 12 to be received by two adjacent row divider snoots 34, the crop row being substantially centered on row center 16. In the embodiment illustrated in FIG. 2, the row crop header may have a pair of stalk rolls 36 aligned substantially parallel to row center 16 and spaced evenly on either side of row center 16 (e.g., assuming that the row crop header has been appropriately positioned with respect to the crop row). The residue guide 50 is shown disposed near the stalk rolls 36 to guide the harvest residue into a relatively narrow strip 22. In the embodiment illustrated in FIG. 2, a pair of residue guides 50 are shown disposed on either side of the stalk rolls 36. However, a single residue guide may be employed in certain embodiments, and the exact placement of residue guide 50 with respect to the stalk rolls 36 and/or the frame 32 may vary from that which is illustrated in FIG. 2, according to certain embodiments of the invention. For example, in embodiments of the invention in which a pair of residue guides 50 are employed, the spacing of the guides 50 with respect to the row center 16 may be made wider or narrower, as desired, thereby affecting the width of the relatively narrow strips 22 of harvest residue 20, and thereby affecting the width of the exposed soil strips 24. As shown in FIG. 2, residue guides 50 may be aligned substantially parallel to row center 16, or they may be oriented at an angle with respect to the row center 16. Residue guides 50 may also be disposed nearer a forward portion of frame 32, or nearer a rearward portion of frame 32, according to various embodiments of the invention.

In one embodiment of the invention, an attachment for a row crop header (e.g., a corn header) comprises a residue guide that projects downwardly from a row crop header to guide the harvest residue so that, during harvesting operations, the residue remains in a relatively narrow strip over the row being harvested. The residue guide may be coupled to the underside of each row unit using available attachment devices, such as existing bolts on the row unit normally used to hold stationary grass knives, for example. Alternatively, the residue guide may be coupled using other attachment mechanisms, such as by clamps or welding, or by using bolt attachments specifically designed for the residue guides, as might be employed in a Manufacturer's Original Equipment design offering to the corn header (or other row crop header) market. In preferred embodiments of the invention, a pair of residue guides may be employed to direct the harvest residue over the row, the residue guides being disposed on each side of the stalk rolls of the row crop header. For example, a pair of residue guides may be employed for a given row unit, the residue guides being positioned a certain distance on either side of the center of the row. This distance may be about 5 inches on either side of the center of the row, or may vary from about 2 inches to about 10 inches or more on either side of the center of the row. The residue guides may be made of sheet metal, for example, or of any other suitable material such as certain plastics, fiberglass and composite materials, for example.

Figure 3:
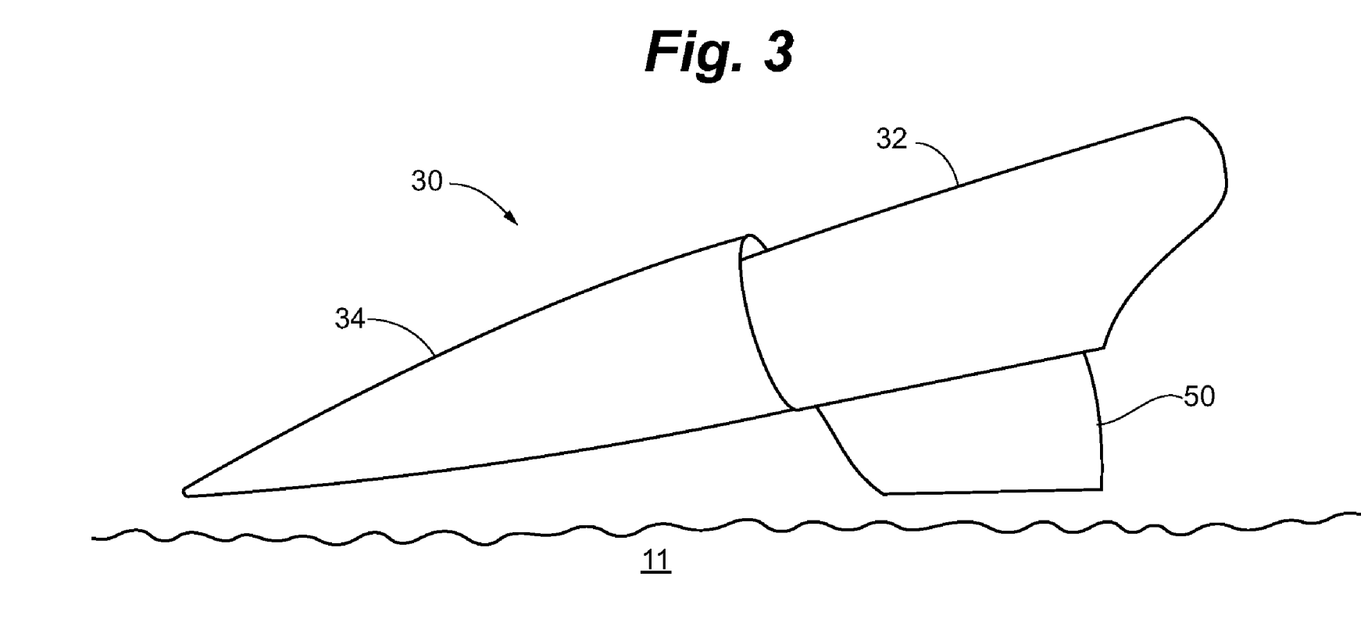
FIG. 3 is a side view of a row crop header according to an embodiment of the invention.

FIG. 3 shows a side view of a row crop header 30 according to an embodiment of the invention. Row crop header 30 may comprise one or more row divider snoots 34, operatively coupled to a frame 32. The frame 32 is adapted to be coupled to a harvesting machine, typically at the front end of a harvesting machine such as a combine. The row crop header 30 may have at least two row divider snoots, but may more typically employ a number of row divider snoots to facilitate harvesting as many as 4, 6, 8, 12, 16, 24, etc., crop rows in a single pass. Of course, these numbers are exemplary only; other configurations are contemplated, and some manufacturers offer corn headers that harvest in odd numbers of rows, for example. A row crop header 30 according to an embodiment of the invention may have a residue guide 50 extending downwardly from frame 32 substantially as shown in FIG. 3. In operation, the row crop header 30 is adapted to operate a distance above the soil 11, although it may also be desirable to have portions of residue guide 50 remain relatively close to a surface of the soil 11 to facilitate guiding of harvest residue.

Figure 4:
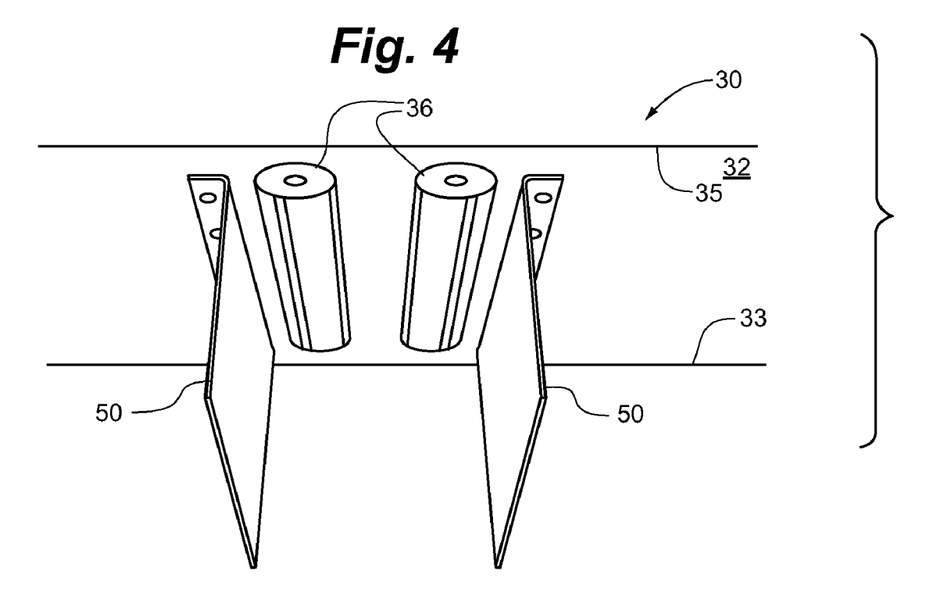
FIG. 4 is a bottom perspective view of a portion of a row crop header according to an embodiment of the invention.

FIG. 4 is a bottom perspective view of a portion of a row crop header 30, showing one possible arrangement of a pair of stalk rolls 36 and residue guides 50 disposed relative to a frame 32 of the row crop header 30. Frame 32 may have a forward portion 33 and a rearward portion 35. As shown in FIG. 4, the residue guides 50 have portions that extend downwardly from frame 32 disposed proximate the stalk rolls 36 to substantially contain and guide the harvest residue as it moves through the row crop header 30 and is returned to the field. The residue guides may be disposed along the outer sides of a pair of stalk rolls 36, as is generally shown in FIG. 4, or may be disposed closer together to vary the width of the strips of harvest residue formed thereby, or to adjust the flow of harvest residue through the guides.

Figure 5:
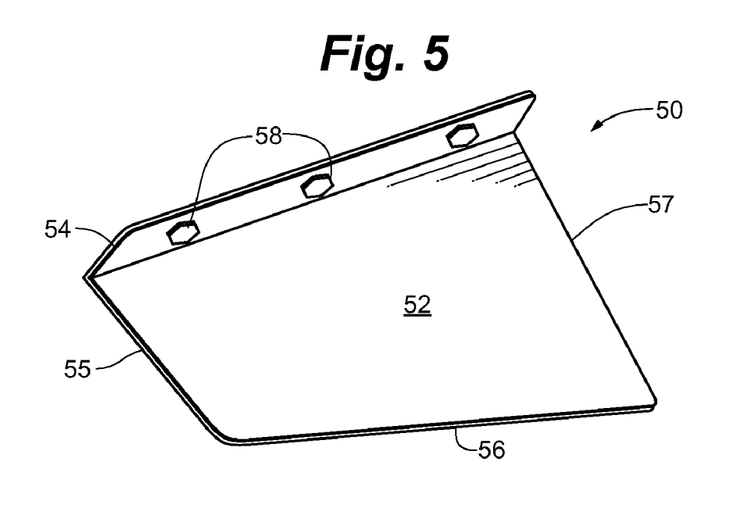
FIG. 5 is a perspective view of a residue guide for a row crop header according to certain embodiments of the invention.

FIG. 5 is a perspective view of a residue guide 50, showing certain features that may be associated with this particular embodiment. For example, the residue guide 50 shown in FIG. 5 has a guide portion 52, comprising a relatively flat surface. Residue guide 50 may also have a mounting portion 54 to facilitate coupling the residue guide 50 to the underside of the frame 32 of a row crop header 30. In some embodiments, the mounting portion 54 of residue guide 50 may be formed by bending a single sheet of material such as sheet metal, for example, to form two relatively flat portions of the residue guide (e.g., the guide portion 52 and mounting portion 54). The formation of a mounting portion and a guide portion could also be accomplished by a molding process (e.g., for a plastic or composite material). The particular embodiment illustrated in FIG. 5 also shows a leading edge 55, a bottom edge 56, a trailing edge 57, and one or more fasteners 58 associated with residue guide 50. In some embodiments, residue guide 50 may have one or more apertures (not shown in FIG. 5) spaced along mounting portion 54 to facilitate the use of one or more fasteners 58. For example, a fastener, such as a bolt or screw, may be readily available on certain row crop header frames, for example, and may be utilized along with the apertures of residue guide 50 to couple the residue guide 50 to the row crop header 30. The particular shape of residue guide 50 shown in FIG. 5 is merely exemplary, and other shapes, including the use of curved and/or angled portions, could readily be used. In some embodiments, for example, the bottom edge 56 may extend downwardly from mounting portion 54 more as you move closer to the trailing edge 57 of residue guide 50, as shown in FIG. 5.

Figure 6:
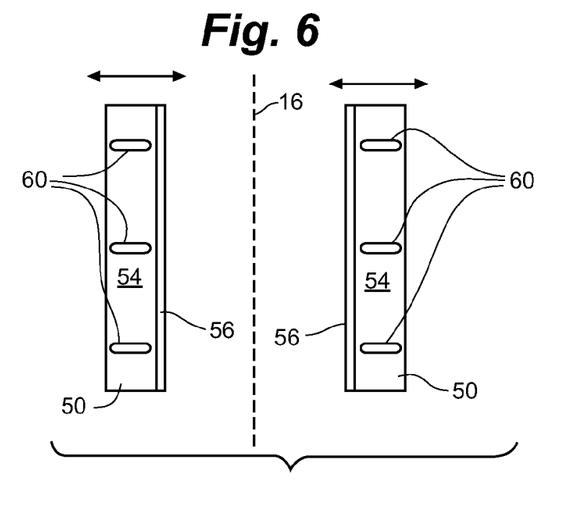
FIG. 6 is a bottom view of a residue guide according to an embodiment of the invention.

FIG. 6 shows an embodiment of the invention in which apertures 60 in mounting portion 54 are elongate in shape and oriented to allow lateral adjustment of the residue guide 50 with respect to desired row center 16. Such adjustment may be performed on one or both residue guides 50, for example, to adjust the width of the relatively narrow strips of harvest residue, or to prevent a pair of residue guides 50 from becoming clogged or plugged with harvest residue.

Figure 7:
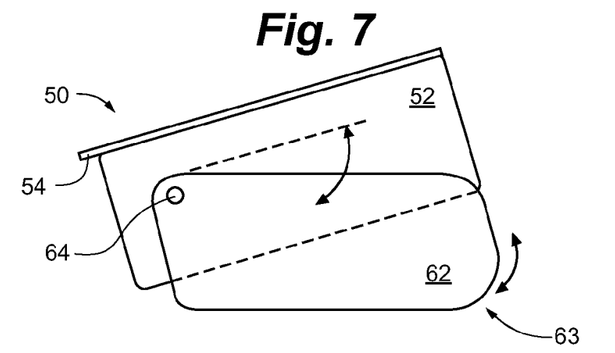
FIG. 7 is a side view of a residue guide according to an embodiment of the invention.

FIG. 7 shows an embodiment of the invention in which residue guide 50 further includes a pivotable extension plate 62 coupled to residue guide 50 and adapted to pivot about a point 64. Such an embodiment might be useful for example by allowing pivotable extension plate 62 to make contact with a top surface of the soil 11 during harvesting operations. Extension plate 62 would be allowed to rotate about pivot point 64, for example, when the extension plate 62 comes in contact with irregularities in the surface of the soil 11, such as rocks, debris, roots, etc. Pivot point 64 may comprise a pin coupling or a swivel mount coupling disposed between extension plate 62 and guide portion 52. Any suitable pivotable coupling known in the art may be employed. In a preferred embodiment, extension plate 62 may have a curved or beveled rear surface 63 that may allow extension plate 62 to pivot such that the rear surface 63 is moved upwards. This feature might be useful, for example, in the event that the harvesting machine is operated inadvertently in a reverse direction, thereby providing some level of protection against damage to the equipment.

Figure 8:
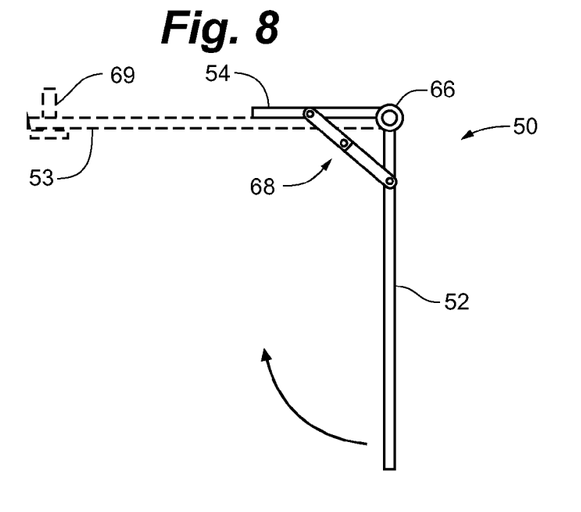
FIG. 8 is a rear view of a residue guide according to an embodiment of the invention.

FIG. 8 shows a residue guide 50 that is hinged at the interface between the mounting portion 54 and the guide portion 52. A hinge 66 may extend the length of residue guide 50, or a number of hinges 66 may be employed to allow the guide portion 52 to be pivoted up and into a stowage position 53. This may be desired, for example, during transportation of the harvesting equipment to and from the field, when the header may be placed on a header transport trailer, or when traveling over irregular terrain. A fastener 69 may be used to stow the guide portion 52 in some embodiments. A locking mechanism 68 may also be employed to lock the guide portion 52 into a downward extending position for harvesting use, according to some embodiments.

Figure 9:
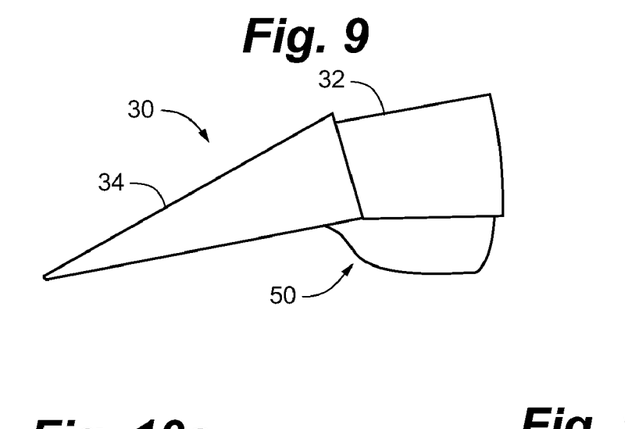
FIG. 9 is a side view of a residue guide according to an embodiment of the invention.

FIG. 9 shows a row crop header 30 according to an embodiment of the invention that employs an integrated residue guide 50. For example, rather than attaching a residue guide 50 to a frame 32 of corn row header 30, corn row header 30 may include residue guide 50 formed as an integral part of frame 32, or of row divider snoot 34, or of both, according to various embodiments of the invention.

Figure 12:
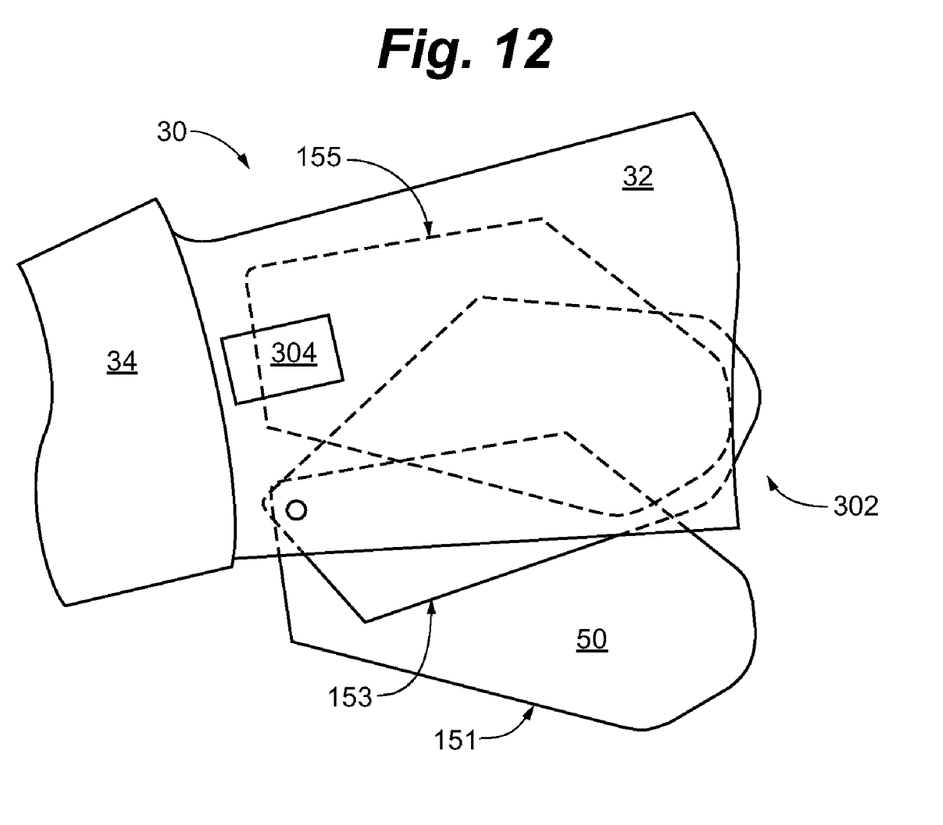
FIG. 12 is an enlarged partial side view of a row crop header with an integrated residue guide system according to an embodiment of the invention.

As used in this context, the term "integrated" includes both (1) embodiments of the invention that are formed of a single, unitary construction (e.g., a frame 32 molded to include downward extending guide portions of a residue guide 50), as well as (2) embodiments of the invention that form an integrated system of components that function to guide harvest residue. An example of a portion of an integrated system is shown in FIG. 12. An integrated system 302 might include, for example, a residue guide 50 pivotably coupled to a frame 32 of a row crop header 30. System 302 might include, for example, motive force 304 (e.g., an electric motor) operatively coupled to residue guide 50 to move residue guide 50 from a harvest guiding position 151 to a stowage position 153.

In an alternate embodiment, motive force 304 may be operatively coupled to move residue guide 50 in a translational manner (e.g., up and down) from a harvest guiding position 151 to a retracted position 155. In some embodiments, motive force 304 may be remotely actuated (e.g., from an operator's position on a harvesting machine, for example).

Figure 10A:
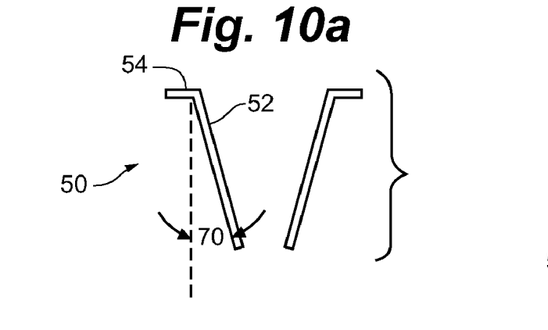
FIGS. 10(a) and 10(b) are front views of pairs of residue guides arranged according to embodiments of the invention.
Figure 10B:
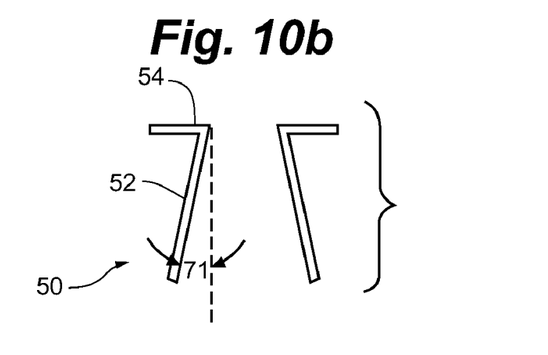

FIGS. 10(a) and 10(b) show the guide portion 52 of residue guide 50 extending downwardly at angles other than vertical. For example, in the embodiment of FIG. 10(a), guide portion 52 extends downwardly from mounting portion 54 at an angle 70 from vertical, substantially as shown. In embodiments having one or more pairs of residue guides 50, the guide portions 52 may extend downwardly at an angle 70 towards each other such that the distance between the guide portions becomes smaller as you move downwardly. In the embodiment of FIG. 10(b), guide portion 52 extends downwardly from mounting portion 54 at an angle 71 from vertical, substantially as shown. In embodiments having one or more pairs of residue guides 50, the guide portions 52 may extend downwardly at an angle 71 away from each other such that the distance between the guide portions increases as you move downwardly.

Figure 11:
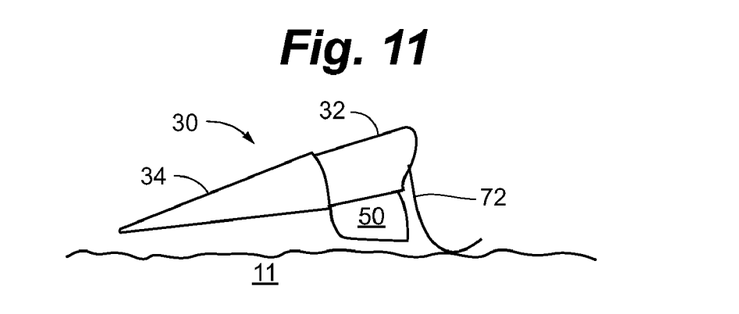
FIG. 11 is a side view of a row crop header in accordance with certain embodiments of the invention.

FIG. 11 shows a row crop header 30 in accordance with certain embodiments of the invention. Row crop header 30 may include one or more row divider snoots 34, a frame 32, one or more residue guides 50 operatively coupled to frame 32, and one or more stalk stomper shoes 72 operatively coupled rearward of residue guides 50. Stalk stomper shoes, such as those manufactured by May-Wes Manufacturing ("Stalk Stompers"), may be coupled to the frame 32 using any suitable fasteners or attachment mechanisms as are known in the art. Attaching a stalk stomper shoe to a row unit of a row crop header may facilitate managing the placement of harvest residue in relatively narrow strips over the crop row being harvested, for example, by resiliently pushing down on harvest residue that passes through the residue guides.

Figure 13:
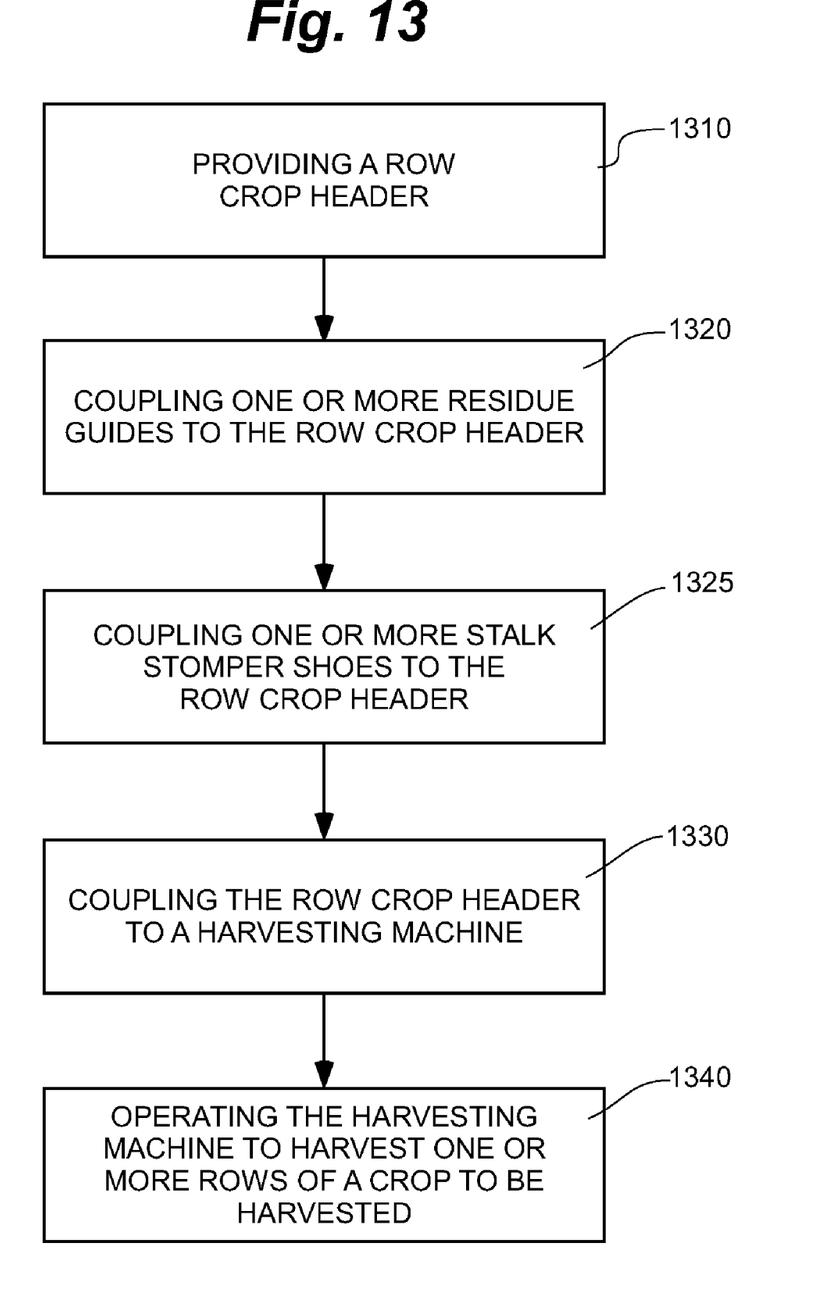
FIG. 13 is a flow chart illustrating a method of guiding harvest residue according to various embodiments of the invention.

FIG. 13 is a flow chart illustrating a method of guiding harvest residue according to various embodiments of the invention. In step 1310, a row crop header, such as a corn row header, is provided. The row crop header may, for example, be adapted to be operatively coupled to a harvesting machine (e.g., mounted to a front portion of a combine) to facilitate harvesting of crops grown in rows. The row crop header may have one or more row units adapted to receive one or more rows of a crop to be harvested. In step 1320, one or more residue guides are coupled to the row crop header. The residue guides may have a mounting portion for coupling the residue guide to the row crop header, and a guide portion extending downwardly from the row crop header. When coupling the one or more residue guides to the row crop header, the residue guides may be positioned such that harvest residue exiting the row crop header is directed by the residue guides into relatively narrow strips proximate the row being harvested.

With continued reference to FIG. 13, step 1330 may include coupling the row crop header to a harvesting machine such as a combine. The harvesting machine is configured to receive rows of crops directed by the row crop header, and extract the harvest product (e.g., ears of corn) from the rest of the plant (e.g., corn stalks, tassels, and leaves). In step 1340, the harvesting machine is operated (e.g., transported through the rows of the crop) to harvest the one or more rows of the crop to be harvested. In some cases, this step involves driving a combine through a field parallel to the direction of crop rows such that the row crop header directs the rows of crops to be harvested into the harvesting machine. This may, for example, include centering the row crop header such that the rows of a crop are substantially centered between adjacent row divider snoots of the row crop header, for example.

In some embodiments of the invention, the method may further comprise coupling one or more stalk stomper shoes to the row crop header rearward of the residue guides (at optional step 1325). For example, the row crop header may have a pair of residue guides associated with a given row (e.g., disposed on either side of the intended row center), and may further have a stalk stomper shoe coupled to the row crop header (e.g., coupled to the frame of the row crop header) rearward of the pair of residue guides. In a preferred embodiment, the stalk stomper shoe would be mounted substantially centered on the intended row center such that it functions to push downwardly on harvest residue that has been guided by the residue guides.

Thus, a METHOD AND APPARATUS FOR GUIDING HARVEST RESIDUE has been provided. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for harvesting row crops, the system comprising:
    a harvesting machine;
    a row crop header including a frame, which is coupled to the harvesting machine, a plurality of row divider snoots operatively coupled to a forward portion of the frame and projecting forward therefrom, and a plurality of pairs of residue guides, each pair of residue guides being operatively coupled to the frame so that, when deployed, each pair of residue guides is located rearward from the forward portion of the frame, so as to extend downwardly from an underside of the frame, and is located behind a corresponding pair of adjacent row divider snoots and adjacent to a corresponding pair of stalk rolls of a plurality of pairs of stalk rolls of the row crop header;
    wherein the plurality of row divider snoots are spaced apart from one another across the frame so that, when the harvesting machine drives the plurality of row divider snoots into a plurality of crop rows, each row divider snoot moves in between adjacent crop rows in order to guide each crop row for harvesting by the harvesting machine; and
    harvest residue from each crop row, that has been harvested by the harvesting machine, when the harvesting machine drives the plurality of row divider snoots into the plurality of crop rows, is guided by each deployed pair of residue guides into a row that is left behind the harvesting machine in the place of the harvested crop row.

2. The system of claim 1, wherein each residue guide is adapted to be moved from the downward extending position to a retracted position or a stowage position.

3. The system of claim 2, further comprising an electric motor operatively coupled to each residue guide to move each residue guide from the downward extending position.

4. The system of claim 1, wherein each residue guide is pivotably coupled to the frame of the row crop header.

5. A method for harvesting a plurality of crop rows employing the system of claim 1, the method comprising:
    deploying the plurality of pairs of residue guides; and
    operating the harvesting machine to drive the plurality of row divider snoots into the plurality of crop rows and to guide harvest residue from each harvested crop row, via the deployed plurality of pairs of residue guides, into a row that is left behind the harvesting machine in the place of the harvested crop row.

6. The method of claim 5, wherein deploying the plurality of pairs of residue guides comprises coupling the row crop header to the harvesting machine, wherein at least a portion of the row crop header and the plurality of pairs of residue guides are integrally formed.

7. The method of claim 5, wherein deploying the plurality of pairs of residue guides comprises coupling the plurality of pairs of residue guides to the underside of the frame of the row crop header and then coupling the row crop header to the harvesting machine.

8. The method of claim 5, wherein deploying each of the plurality of residue guides comprises moving each residue guide from a stowage position to the downward extending, harvest guiding position.

9. The method of claim 8, wherein deploying each of the plurality of residue guides further comprises locking each residue guide into the downward extending, harvest guiding position.

10. The method of claim 5, further comprising coupling a plurality of stalk stomper shoes to the row crop header, such that each stalk stomper shoe is located rearward of a corresponding pair of residue guides.

* * * * *